United States Patent Office 3,238,152
Patented Mar. 1, 1966

3,238,152
PROCESS FOR THE PRODUCTION OF POLYMERIC ORGANIC BORON-NITROGEN COMPOUNDS
Elmar-Manfred Horn, Aachen, Germany, assignor to Farbenfabriken Bayer Aktiengesellschaft, Leverkusen, Germany, a German corporation
No Drawing. Filed Apr. 8, 1963, Ser. No. 275,471
Claims priority, application Germany, Apr. 13, 1962, F 36,545
15 Claims. (Cl. 260—2)

The present invention relates to new organic boron-nitrogen polymers and further to a process for the manufacture of said polymers.

It is an object of the present invention to provide new and useful organic boron-nitrogen polymers. Another object of the invention is to provide organic boron-nitrogen polymers which may be employed as neutron-absorbing substances. Another object is to provide organic boron-nitrogen polymers as highly heat resisting resins, waxes or oils. A further object of the invention is to provide organic boron-nitrogen polymers which may be applied as intermediates in the production of various high polymers. Another object of the invention is to provide a process for the production of said organic boron-nitrogen polymers which process can easily be performed and leads to high yields.

In the process according to the invention amine borines of the general formula $$A \rightarrow BH_3$$

wherein A denotes a primary, secondary or tertiary aliphatic, cycloaliphatic, aromatic amine, a mixed aliphatic-cycloaliphatic-aromatic amine or a heterocyclic nitrogen base, are heated with nitriles of the general formua $$R^4(CN)_n$$

wherein $R^4$ is a hydrocarbon radical and $n$ denotes a number equal to at least 1, preferably 1–6. High molecular organic boron-nitrogen compounds are obtained possessing, for example, molecular weights of 500 or more by splitting off hydrogen and the amine component of the amine borine. Preferably, one mol of amine borine is employed per each mol of nitrile group, but the process can also be performed with other molar proportions of nitrile and amine borine.

Depending upon the conditions of production and the nitriles employed, resins, pastes or oils are obtained which exhibit a surprising stability.

Reactions between nitriles and boron compounds are known as such. From acetonitrile and diborane, for example, an unstable complex of the empirical formula $CH_3CN$—$BH_3$ is obtained [Schlesinger, Burg: Chem. Rev. 1942, vol. 31, p. 1].

A reaction between acetonitrile and boron trifluoride has also been observed which likewise resulted in a complex of the formula $CH_3CN \cdot BF_3$ [Hoard, Owen, Buzzel, Salmon: Acta Cryst. 3, 121 (1950)]. It is also known to produce borazoles from aliphatic nitriles and diborane (U.S. patent specification No. 3,008,988).

For the present process triorgano-amine borines are preferably used, because they are easily obtainable, as for example trialkyl amine borine, preferably with 1 to 20 carbon atoms, such as trimethyl-amine-borine, triethyl-amine-borine, tripropyl-amine-borine, diethyl-butyl-amine-borine; mixed alkyl-cycloalkyl-amine-borines, such as dimethyl-cyclo-hexyl-amine-borine; alkyl-aryl-amine-borines, preferably alkyl-phenylamine-borines, such as di-methyl-phenyl-amine-borine; heterocyclic nitrogen bases, such as pyridine borine, C-alkyl-pyridine borines such as 2-methyl-pyridine-borine.

On the other hand diorgano and monoorgan amine-borines may be used such as dimethyl-amine borine, diethyl-amine-borine, lauryl-amine-borine.

Organic monocyanides or compounds with two or more nitrile groups in the molecule may be used as nitriles for the process according to the invention. Examples of mononitriles are: acetonitrile, propionitrile, butyronitrile, the nitriles of octane-, dodecane- and hexane-carboxylic acid, 3-cholor-propionitrile, optionally nuclear-substituted hexahydro-benzoic acid nitriles, optionally nuclear-substituted benzonitriles (e.g. benzonitrile and 2-chloro-benzonitrile) and optionally nuclear-substituted naphtho-nitriles. Examples of compounds with several nitrile groups in the molecule are: malonic acid dinitrile, glutaric acid dinitrile, adipic and dinitrile, cyanoform and 1,1,3,3-tetracyanopropane. The organic radical carrying one or more nitrile groups may moreover be saturated, or aromatically, olefinically or acetylenically unsaturated. The alkane, alkene and alkine groups of the nitriles carry preferably 1 to 30 carbon atoms. When olefinically or acetylenically unsaturated compounds are used such as, for example, acrylonitrile, 1,4-dicyano-butene-(2) or 1,1, 2,2-tetracyanethylene, a hydroboration of the double or triple bond occurs in most cases, under the conditions of the process according to the invention, in addition to the reaction of the amine-borines with the nitrile group, and this often leads to an additional cross-linking of the polymeric boron-nitrogen compounds. A further possibility of influencing the properties of the polymeric boron-nitrogen compounds produced according to the invention consists in using the nitrile component not as a well-defined uniform compound, but any desired nitrile mixtures. The reactions, on which the process according to the invention is based, are carried out at temperatures above, a temperature of 18° C., preferably at temperatures between 100 and 500° C., and the operation may be performed under normal pressure, under foreign gas pressure (e.g. nitrogen pressure), or also under hydrogen pressure caused by the hydrogen which is split off in the course of the reaction.

The properties of the boron-containing polymers produced according to the process of the present invention can also be influenced to a great extent by carrying out the production in specific manner, for example:

(1) By mixing the nitrile and amine-borine component, followed by heating to the reaction temperature under normal or increased pressure, or (2) By heating one of the starting products to the reaction temperature and then adding the other component, for example through a dropping funnel or, when working under pressure, for example, by means of a dosing pump, or (3) By carrying out the reaction either by the method described under (1) or under (2), in an inert solvent or dispersing agent. Benzene, toluene or xylene can be used for this purpose for example.

The reaction mechanism of the new process as well as the definite members of the polymers are still unknown. According to the known reactions, however, we assume that BN-bonds are formed, whereby in many cases the boron atoms are carrying hydrogen to some extent.

The polymeric molecules are due to the trivalent boron, generally in the form of a complex-three-dimensional structure, although the same may also assume a branched or linear configuration. The polymers according to the invention are oils, waxes or resins.

Some polymers have softening points. Others, however, show no sintering at temperatures of above 600° C.

The following examples are given for the purpose of illustrating the invention.

Example 1

Into a round flask fitted with stirrer, immersion thermometer, dropping funnel and descending condenser there are placed 115 grams (1 mol) of triethylamine-borine dissolved in 500 ml. of 1,2,4-trimethyl-benzene, this mixture is heated to about 145° C. and 117 grams (1 mol) of benzyl cyanide are then added dropwise within about 45 minutes. The content of the flask turns thereby via a green and orange color to a bright red and finally to an intense red color, with the evolution of hydrogen. The mixture is heated at sump temperatures of about 160° C. for 90 minutes while distilling off the dissociated triethylamine, and the 1,2,4-trimethyl-benzene used as solvent is finally distilled off in a vacuum. After drying in a vacuum there are obtained 132 grams of an intense yellow resin which is soluble in benzene, carbon disulfide and carbon tetrachloride and contains 6.9% of boron, 9.8% of nitrogen and 0.02% of active hydrogen (determined gasometrically by hydrolysis with warm semi-concentrated sulfuric acid). The molecular weight as determined ebullioscopically in benzene, amounts to 1500±100; the melting point lies at about 165° C.

Example 2

In a 0.8 litre-autoclave purged with nitrogen and fitted with stirrer, a mixture consisting of 230 grams (2 mols) of triethyl-amine-borine and 234 grams (2 mols) of benzyl cyanide is heated at 160–170° C. for 3½ hours whereby a pressure of 100 atmospheres results. After cooling to room temperature the final pressure amounts to 24 atmospheres. The practically pure hydrogen (identified by gas chromatography) is blown off, the content of the autoclave transferred to a round flask, the triethylamine, split off from the triethyl-amine-borine, is distilled off, the residue dried in a vacuum and 250 grams of a yellow resin, which is soluble in benzene, carbon tetrachloride, carbon disulfide, dioxan and tetrahydrofuran and contains 7.9% of boron, 10.25% of nitrogen and 0.02% of active hydrogen, are obtained. The melting point lies at about 205° C.

Example 3

In a 0.8 litre-autoclave 173 grams (1.5 mols) of triethylamine-borine and 176 grams (1.5 mols) of benzyl cyanide mixed with 200 ml. of benzene are heated at 165–170° C. with stirring for one hour. The reaction product is worked up as described in th preceding examples. There are obtained 192 grams of a yellow resin which is soluble in, for example, benzene and tetrahydrofuran and contains 7.3% of boron and 0.11% of active hydrogen. The molecular weight, determined ebullioscopically in benzene, amounts to 2000±100; the melting point of the resin lies at about 175° C.

Example 4

In a 2.7 litre-autoclave, which has been purged with nitrogen, 403 grams (3.5 mols) of triethyl-amine-borine are heated to 180° C., 410 grams (3.5 mols) of benzyl cyanide are evenly pumped into the autoclave within one hour by means of a dosing pump, and the reaction mixture is then heated at 200° C. for a further hour. A pressure of 79 atmospheres results. After cooling to room temperature the final pressure amounts to 20 atmospheres. The reaction product is worked up as described before, and 445 grams of an orange-colored resin containing 7.6% of boron and 0.07% of active hydrogen are obtained. The molecular weight, determined ebullioscopically in benzene amounts to 6000±1000. The substance turns pale brown in a closed tube at temperatures of 260° C. Up to 600° C. no melting or sintering could be observed.

Example 5

In a 0.8 litre-autoclave, fitted with stirrer, a mixture consisting of 21 grams (0.2 mol) of benzonitrile, 211 grams (1.8 mols) of benzyl cyanide and 230 grams (2 mols) of triethyl-amine-borine is heated at 200° C. for 1½ hours whereupon a pressure of 130 atmospheres results. 230 grams of a yellow resin, which is soluble in benzene and contains 7.8% of boron and 0.07% of active hydrogen, are obtained from the reaction mixture. The melting point lies at about 184° C.

A number of further nitriles were reached in an autoclave of 0.8 litre capacity with triethylamine-borine and other amine borines according to Examples 3 and 5. The quantities employed, the reaction conditions and the properties of the resulting polymeric boron-hydrogen compounds are listed in the following tables. Therein percent $H_a$ denotes the content in percent of active hydrogen (hydride hydrogen directly linked with boron) as gasometrically determined by hydrolysis with warm, semi-concentrated sulfuric acid.

| Exp. No. | Nitrile employed | Quantity | Triethylamine-borine | Reaction conditions | | Quantity in grams |
|---|---|---|---|---|---|---|
| | | | | Time in hrs. | Temp. in °C. | |
| 6 | $CH_3-C\equiv N$ | 123 g.=3 mols | 345 g.=3 mols | 3.5 | 170 | 158 |
| 7 | ⌬—C≡N | 258 g.=2.5 mols | 288 g.=2.5 mols | 2 | 300 | 267 |
| 8 | Cl-⌬—C≡N | 275 g.=2 mols | 230 g.=2 mols | 2 | 310–320 | 276 |
| 9 | naphthyl-C≡N | 153 g.=1 mol | 115 g.=1 mol | 3 | 300 | 142 |
| 10 | $N\equiv C-(CH_2)_4-C\equiv N$ | 162 g.=1.5 mols | 345 g.=3 mols | 2.5 | 160 | 155 |
| 11 | $N\equiv C-CH_2-CH=CH-CH_2-C\equiv N$ | 106 g.=1 mol | 345 g.=3 mols | 1 | 250 | 138 |

| Exp. No. | Color | Polymeric boron-nitrogen compounds | | | M.P., °C. |
|---|---|---|---|---|---|
| | | Analysis | Soluble in e.g. | Molec. weight | |
| 6 | Egg yolk | 16.4% B, 21.85% N, 0.35% $H_a$. | Only little in dioxan $CS_2$, $CCl_4$, tetrahydrofuran. | | Turns pale brown at 360° C., no sintering up to 600° C. |
| 7 | Grey | 8.9% B, 11.6% N, 0.22% $H_a$ | Benzene, dioxan, $CS_2$, $CCl_4$ | 900±30 (ebullioscopically in benzene). | ~72. |
| 8 | Grey-yellow | 6.4% B, 21.03% Cl, 0.15% $H_a$ | Benzene, dioxan | | ~80. |
| 9 | Yellow-brown | 7.6% B, 0.02% $H_a$ | Benzene, $CS_2$ | | ~150. |
| 10 | Pale yellow | 14.8% B, 19.15% N, 0.27% $H_a$ | Little in hot ethanol | | Turns dark yellow at 300° C., no sintering up to 600° C. |
| 11 | Grey slightly | 16.3% B, 0.14% $H_a$ | Barely in warm $CS_2$ | | Turns grey-brown at 420° C., no sintering up to 600° C. |

| Exp. No. | Starting substances | | Reaction conditions | | Quantity in grams |
|---|---|---|---|---|---|
| | Nitrile | Borazene | Time in hrs. | Temp. in °C. | |
| 12 | Coconut oil acid nitrile of the mean composition $C_{12.45}H_{25.9}$—C≡N, 293 g. | Triethylamine-borine, 173 g.=1.5 mol | 2 | 300 | 295 |
| 13 | $C_5H_{11}$—C≡N, 146 g.=1.5 mol | do | 2 | 230 | 165 |
| 14 | $C_{17}H_{35}$—C≡N, 265 g.=1 mol | Triethylamineborine, 115 g.=1 mol | 2.5 | 220 | 258 |
| 15 | $C_2H_5$—C≡N, 83 g.=1.5 mol | $C_6H_{11}N(CH_4)_2.BH_3$, 212 g.=1.5 mol | 2.5 | 200 | 100 |
| 16 | $CH_3$—C≡N, 103 g.=2.5 mol | $C_6H_5N(CH_3)_2.BH_3$, 338 g.=2.5 mol | 3 | 170-180 | 102 |
| 17 | $C_2H_5$—C≡N, 83 g.=1.5 mol diluted with 350 ml. benzene. | Pyridine-borine, 140 g.=1.5 mol | 2 | 190-200 | 102 |
| 18 | $C_2H_5$—C≡N, 165 g.=3 mol | Triethyl-amineborine, 345 g.=3 mol | 3.5 | 160 | 127 |

| Exp. No. | Color | Polymeric boron-nitrogen-compounds | | | Properties |
|---|---|---|---|---|---|
| | | Analysis | Soluble in e.g. | Mol-weight | |
| 12 | Pale brown oil | 73.17% C, 12.61% H, 4.95% B, 6.81% N | Benzene, hexane, $CHCl_3$, $CCl_4$, tetrahydrofuran. | 1,150 (ebull. in benzene). | $d_4^{20}$=0.881; η 20°=608 cP. |
| 13 | do | 65.48% C, 12.12% H, 9.2% B, 12.01% N | Benzene, ligroin, $CHCl_3$, $CCl_4$ | 680 (ebull. in benzene). | $d_4^{20}$=0.885; η 20°=312 cP. |
| 14 | Pale grey wax-like. | 77.17% C, 13.48% H, 3.8% B | Benzene, tetrahydrofuran, $CCl_4$, $CHCl_4$. | 1,700 (ebull. in benzene). | M.P. 40° C. |
| 15 | Pale yellow | 48.48% C, 9.28% H, 14.52% N, 12.0% B, 0.04% $H_a$. | Little in benzene | | M.P. appr. 225° C. |
| 16 | Yellow | 46.07% C, 8.63% H, 20.75% N, 15.8% B, 0.35% $H_a$. | Benzene, dioxan, ether, pyridine, $CS_2$. | | |
| 17 | Dark yellow | 49.85% C, 8.85% H, 17.55% N, 11.33% B. | Little in benzene | | M.P. appr. 380° C. |
| 18 | Yellow | 48.81% C, 9.43% H, 19.4% N, 13.53% B | Benzene | 2,000 (cryosc. in benzene). | M.P. appr. 175° C. |

I claim:

1. A process for the production of polymeric organic boron-nitrogen compounds which comprises heating an amine-borine $$A \rightarrow BH_3$$

wherein A is a member selected from the group consisting of pyridine, C-alkyl pyridines, and an amine of the formula

wherein $R^1$ and $R^2$ are each a member selected from the group consisting of hydrogen, alkyl having 1 to 20 carbon atoms, cyclohexyl and phenyl, and $R^3$ is a member selected from the group consisting of alkyl having 1 to 20 carbon atoms, cyclohexyl and phenyl with a nitrile of the formula $$R^4(CN)_n$$

wherein $n$ is an integer of from 1 to 4 and $R^4$ is a member selected from the group consisting of alkyl, alkenyl, phenyl, naphthyl, phenyl-alkyl, and halo-phenyl at a temperature between 100–500° C. wherein said amine borine and nitrile are used in a molar proportion of nitrile groups: amine borine of 1:1.

2. Process according to claim 1, characterized in that the reaction is carried out in an inert medium selected from the group consisting of a solvent and a dispersing agent.

3. Process according to claim 1 wherein said nitrile is a member selected from the group consisting of benzyl-cyanide, coconut oil acid nitrile of the mean composition of $$C_{12.45}H_{25.9}C\equiv N,$$
$$C_5H_{11}-C\equiv N,$$
$$C_{17}H_{35}-C\equiv N,$$
$$C_2H_5-C\equiv N,$$
and
$$CH_3-C\equiv N.$$

4. Polymeric organic boron-nitrogen compounds obtained according to the process of claim 1.

5. Polymeric organic boron-nitrogen compounds obtained by heating triethylamine-borine and benzyl cyanide in a molar ratio of about 1:1 at temperatures of about 100–500° C.

6. A process for the production of polymeric organic boron-nitrogen compounds in which process triethylamine-borine dissolved in 1,2,4-trimethylbenzene is heated with benzyl cyanide to temperatures of about 100 to 160° C. in a molar ratio of 1:1.

7. A process for the production of polymeric organic boron-nitrogen compounds in which process triethylamine-borine and benzyl cyanide in a molar ratio of about 1:1 are heated to temperatures of about 100–190° C. under pressure of the hydrogen split off during the reaction.

8. A process for the production of polymeric organic boron-nitrogen compounds in which process triethylamine-borine is heated with benzyl cyanide in a molar ratio of about 1:1 to temperatures of about 100–500° C. under pressure of the hydrogen split off during the reaction, whereby the whole amount of the benzyl cyanide is added in the course of the reaction.

9. A process for the production of polymeric organic boron-nitrogen compounds in which process triethylamine-borine is heated with a mixture of benzyl cyanide and benzonitrile in a molar ratio of nitrile groups to amine-borine of about 1:1 at temperatures of about 100–500° C. and at a pressure of the hydrogen split off during the reaction.

10. A process for the production of polymeric organic boron-nitrogen compounds in which process triethylamine-borine is heated with acetonitrile in a molar ratio of about 1:1 at temperatures of about 100–500° C. under a pressure of the hydrogen split off during the reaction.

11. Polymeric organic boron-nitrogen compounds obtained according to the process of claim 10.

12. A process for the production of polymeric organic boron-nitrogen compounds in which process triethylamine-borine is heated with 2-chloro-benzonitrile in a molar ratio of about 1:1 at temperatures of about 100–500° C. under a pressure of the hydrogen split off during the reaction.

13. Polymeric organic boron-nitrogen compounds obtained according to the process of claim 12.

14. A process for the production of polymeric organic boron-nitrogen compounds in which process triethylamine-borine is heated with naphthonitrile in a molar ratio of about 1:1 at temperatures of about 100–500° C. under a pressure of the hydrogen split off during the reaction.

15. Polymeric organic boron-nitrogen compounds obtained according to the process of claim 14.

References Cited by the Examiner

UNITED STATES PATENTS

| 3,011,991 | 12/1961 | Anderson et al. | 260—32.4 |
| 3,011,992 | 12/1961 | Anderson | 260—32.4 |

OTHER REFERENCES

Emeleus et al.: "Jour. Chem. Soc.," 1960, pages 2614–7.

MURRAY TILLMAN, *Primary Examiner.*

SAMUEL H. BLECH, *Examiner.*